June 9, 1964 J. N. MIALE ETAL 3,136,713
SELECTIVE COMBUSTION
Filed June 30, 1960

*INVENTORS*
Joseph N. Miale
BY Paul B. Weisz

*Raymond W. Barclay*
ATTORNEY

United States Patent Office

3,136,713
Patented June 9, 1964

3,136,713
SELECTIVE COMBUSTION
Joseph N. Miale, Runnemede, N.J., and Paul B. Weisz,
Media, Pa., assignors to Socony Mobil Oil Company,
Inc., a corporation of New York
Filed June 30, 1960, Ser. No. 39,868
9 Claims. (Cl. 208—113)

This invention relates to a method for effecting selective combustion of a portion of a combustible mixture of molecules. In general, the present invention is directed to a method for selectively burning a portion of a combustible fluid made up of components of different molecular size. The term fluid, as used herein, will be understood to refer to either a gaseous or liquid phase, or both. More particularly, the invention is concerned with a method for effecting selective combustion of a portion of a combustible mixture in the presence of an oxidant and a crystalline solid essentially characterized by rigid three dimensional networks and interstitial dimensions such that only the oxidant and a portion of the combustible species of molecules and combustion products thereof of suitable size and shape may be transported in either direction between the exterior phase and the interior of the crystalline solid, which solid is essentially characterized by having included within the interior thereof a chemical component possessing catalytic oxidation activity.

In one embodiment, the invention comprises a method for continuous purification of a gaseous stream composed of at least two components of different molecular size by bringing said stream together with a gaseous oxidant to contact with a solid crystalline aluminosilicate having rigid three dimensional networks of dimensions sufficiently large to admit at least one of said components but sufficiently small to exclude at least one remaining component and bearing within the interior thereof a chemical component having catalytic oxidation activity, wherein the contact is carried out at a temperature sufficiently elevated to effect the selective combustion of the component which is admitted to the inerior of the aluminosilicate and to yield a resulting product free of such latter component.

In another embodiment, the invention affords a process for selectively effecting combustion of a combustible mixture of molecules of different molecular size by passing the same together with an oxidant at combustion temperature over a crystalline aluminosilicate having rigid three dimensional networks and crystalline cavities accessible through ports of dimensions within the range of about 4 to about 7 angstroms, said cavities having included therein a material catalytically active for oxidation, whereby at least one species of the molecules is selectively admitted by reason of its molecular size relative to the aforementioned dimensions to the interior of said cavities containing catalytically active material and to undergo combustion therein, while the remainder of the molecules by reason of their larger size are prevented from gaining entrance to the interior of said cavities and making contact with the catalytically active material contained therein.

In another important embodiment, this invention provides a method for internally heating a reaction zone in which a fluid charge is contacted by introducing into said zone a combustible fuel component, an oxidant and a crystalline aluminosilicate having rigid three-dimensional networks bearing within the interior thereof surfaces characterized by a catalytic oxidation activity greater than that possessed by the exterior surfaces of the aluminosilicate and having uniform interstitial dimensions sufficiently large to admit the fuel component and the oxidant but sufficiently small to exclude molecules of the charge and thereafter initiating burning of said fuel component in contact with the catalytic oxidation surfaces.

In a still further embodiment, the present invention provides a method for internally heating a catalytic reaction zone wherein an endothermic reaction involving a fluid charge is carried out in the presence of a conversion catalyst by introducing into the reaction zone an oxidant and a combustible fuel component and in admixture with the conversion catalyst, a crystalline aluminosilicate having rigid three-dimensional networks bearing within the interior thereof a material having catalytic oxidation activity and having uniform interstitial dimensions sufficiently large to admit the oxidant and fuel component but sufficiently small to exclude the fluid charge and initiating combustion of the fuel component in contact with the catalytically active oxidation material, whereby, the temperature of the reaction zone is sufficiently raised to affect catalytic conversion of the fluid charge in the presence of the conversion catalyst.

The method described herein is thus concerned with catalytic combustion carried out in the presence of a crystalline inorganic aluminosilicate structure of very well defined intra-crystalline dimensions, which has the ability by reason of its intra-crystalline dimensions to allow the passage into or out of its crystalline cavities of only certain molecules, that is, of molecules having particular shape or size. By associating catalytic oxidation activity specifically with the intra-crystalline spaces for the mixture of molecules undergoing reaction, only the combustion is obtained of molecular species of specific shapes or sizes capable of entering the ports of the crystalline structure while other species of the mixture are excluded from contact, by reason of their size, with the catalytic oxidation surfaces. Such crystalline materials wherein only molecules of particular size and shape are able to enter have been referred to as molecular sieves.

In accordance with the method of the invention, catalytic combustion selectivity is achieved by establishing catalytically active surfaces within the intracrystalline volume of substances which act as molecular sieves and in which the sieve dimensions are in such relation to the chemical species involved in catalytic combustion that only selected species are permitted to pass the sieve structure.

Suitable catalytic oxidation surfaces are achieved by deposition within the pores of the crystalline aluminosilicate structure of a transition metal or compounds thereof capable of catalytically promotiing oxidation. Such metals are well known to those in the art and include metals of atomic numbers 22 to 29, 42 to 47 and 74 to 78 inclusive. Rare earth elements and compounds thereof may also, in some instances, be found useful. Deposition of the metal within the crystalline aluminosilicate may be accomplished by growth of the aluminosilicate crystals in a solution containing an ion of such metal. Thus, suitable crystalline inorganic aluminosilicates containing a transition metal distributed within the pores thereof may be produced by effecting the growth of crystals of the aluminosilicate from an aqueous mixture containing a water-soluble ionizable transition metal compound, dehydrating the resulting transition metal containing crystalline product and subjecting the same to a thermal treatment at an elevated temperature. The resulting product comprises a transition metal dispersed within the pores of the crystalline aluminosilicate structure characterized by rigid three dimensional networks and an effective pore diameter within the approximate range of about 4 to about 7 angstroms. An effective crystalline aluminosilicate having a platinum metal distributed within its uniform structure may be prepared, as described in copending application Serial No. 774,124, filed November 17, 1958, by introducing into an aqueous reaction solution having a composition, expressed as mixtures of oxides, within the following ranges $SiO_2/Al_2O_3$ of 0.5 to 2.5, $Na_2O/SiO_2$ of 0.8 to 3.0 and $H_2O/Na_2O$ of 35 to 200, a minor proportion of a water-soluble ionizable platinum metal compound, inducing crystallization of the resulting reaction mixture by subjecting the same to hydrothermal treatment, replacing sodium ions of the resulting crystalline product with calcium, dehydrating the material so obtained and thermally treating at a temperature in the approximate range of 250° F. to 1100° F. to effect at least partial conversion of the platinum metal-containing ion to a catalytically active state, thereby yielding a resulting composition having platinum metal dispersed with the pores of a crystalline aluminosilicate characterized by rigid three dimensional networks and uniform pores approximately 5 angstroms in diameter.

Aside from introducing the transition metal into the aluminosilicate structure during the process of crystal growth, such metal may be deposited within the interior of the crystalline aluminosilicate by base-exchange of an initially formed alkali metal or alkaline earth metal aluminosilicate with a solution containing an ion of the desired metal. Utilizing this manner of operation, it is generally desirable to remove active catalytic oxidation surfaces attributable to deposition of the metal ion on the outer surface of the crystalline aluminosilicate lattice by either of two methods. One method utilizes the effect of additional base-exchange treatment with a solution containing an ion of size too large to enter the cavities, but effective in exchanging catalytically active to catalytically inactive ions in all external locations. Another method relies on contacting the base-exchanged material with a substance capable of poisoning the oxidation active ions externally but incapable of reaching and thus effecting the active sites located within the cavities. By whatever method may be employed, the catalytic oxidation surface is caused to be contained only within the crystalline pore structure and to thereby afford a resulting product capable of effecting desired selective catalytic combustion.

Crystalline alkali metal and alkaline earth metal aluminosilicates employed in preparation of the transition metal-containing composites described herein are essentially the dehydrated forms of crystalline natural or synthetic hydrous siliceous zeolites containing varying quantities of alkali or alkaline earth metal and aluminum. The alkali or alkaline earth metal atoms, silicon, aluminum and oxygen in these zeolites are arranged in the form of an aluminosilicate salt in a definite and consistent crystalline pattern. In general, the process for preparing such aluminosilicates involves heating, in aqueous solution, an appropriate mixture of oxides, or of materials whose chemical composition can be completely represented as a mixture of oxides $Na_2O$, $Al_2O_3$, $SiO_2$ and $H_2O$ at a temperature of approximately 100° C. for periods of 15 minutes to 90 hours or more. The product, which crystallizes within this hot mixture is separated therefrom and water washed until the water in equilibrium with the zeolite has a pH in the range of 9 to 12 and thereafter is dehydrated by heating. Usually, an alkali metal silicate serves as the source of silica and an alkali metal aluminate as the source of alumina. An alkali metal hydroxide is suitably used as the source of the alkali metal ion, and, in addition, contributes to the regulation of the pH. All reagents are preferably soluble in water. Generally, a sodium aluminosilicate is employed. Preferably, the reaction solution has a composition expressed as mixtures of oxides within the following ranges $SiO_2/Al_2O_3$ of 0.5 to 2.5, $Na_2O/SiO_2$ of 0.8 to 3.0 and $H_2O/Na_2O$ of 35 to 200. The reaction mixture is placed in a suitable vessel which is closed to the atmosphere in order to avoid losses of water and the reagents are then heated for an appropriate length of time. Crystallization may be obtained at temperatures from 21° C. to 150° C. After formation, the crystalline zeolite is separated from the mother liquor, usually by filtration. The crystalline mass is then washed, preferably with water and while on the filter, until the wash water, in equilibrium with the zeolite, reaches a pH of 9 to 12. The sodium aluminosilicate crystals are then dried, generally at a temperature between 25° C. and 150° C.

The ability to combust only specific hydrocarbons from a stream utilizing as a catalyst a crystalline calcium aluminosilicate characterized by a uniform effective pore diameter of 5 angstroms and having platinum contained within the crystalline structure as a result of preparation by the method set forth in copending application Serial No. 774,124, filed November 17, 1958 is demonstrated by the following data:

"The reaction mixture was passed in each instant in a helium stream over the catalyst and subsequently and immediately the products were analyzed by a chromatographic column. Such technique allows the use of very small quantities of test catalyst. All of the examples were carried out with 0.15 ml. of catalyst, a gas velocity of 60 cc./min. and at varying combustion temperatures. The conditions corresponded to a liquid hourly space velocity of the hydrocarbon of approximately 300. The helium carrier gas is not essential but is utilized solely as a convenience in the use of the chromatographic method of analysis. The table below summarizes the results obtained with four hydrocarbons with normal chain structure, and two hydrocarbons with branched chain structures."

| Example | Hydrocarbon | HC/O$_2$ Ratio | Converted to CO$_2$ (weight percent) | | |
|---|---|---|---|---|---|
| | | | 500° F. | 600° F. | 700° F. |
| 1 | n-Butane | 1:17 | 24 | 55 | 69 |
| 2 | 1-butane | 1:7 | | 99 | |
| 3 | 1-pentane | 1:7 | | 90 | |
| 4 | 1,3-butadiene | 1:17 | | 67 | |
| 5 | Iso-butane | 1:7 | no conversion | | |
| 6 | Isoprene | 1:7 | no conversion | | |

It will be evident from the above that the straight chain molecules underwent combustion to $CO_2$ while the branched chain hydrocarbons, being unable, by reason of their molecular size, to enter the pores of the crystal-oxygen, ozone, sulfur dioxide, sulfur, chlorine, nitrogen surfaces contained within the crystalline structure failed to undergo combustion. Thus, selective catalytic combustion is achieved.

In similar manner, straight chain hydrocarbons, straight chain and primary alcohols, as well as $H_2S$, CO, $H_2$ and $NH_3$ may be selectively subjected to combustion when admixed with branched chain hydrocarbons, naphthenes, aromatics and other molecules having at least one dimension exceeding the effective pore diameter of the aluminosilicate structure. Thus, for example, by suitable selection of an aluminosilicate structure of appropriate pore dimensions, removal by combustion, in situ, of a hydrocarbon conversion reaction, of $H_2S$ therein liberated, by admixture with an oxidant, such as air, may be readily achieved.

The selective combustion process described herein may involve a gas, liquid, or mixed phase reaction. A wide variety of oxidant materials may be employed including oxygen, ozone, sulfur dioxide, sulfur, chlorine, nitrogen oxides, and the like as well as mixtures thereof, including diluted mixtures of which air is an outstanding example.

The temperature at which the process is carried out is sufficiently elevated to accomplish catalytic combustion of the material in the pores of the crystalline aluminosilicate and in contact with the oxidation surfaces contained therein but not sufficiently great as to effect combustion of the unsorbed material or to adversely affect the catalytic properties of the crystalline aluminosilicate structure. Generally, the temperature at which selective combustion is effected is within the approximate range of 250° F. to 900° F. and usually between about 400° F. and about 750° F.

The process may be carried out in any feasible manner as a continuous or batch process such as, for example, in a fixed bed operation, compact moving bed operation or in a fluidized operation.

The present invention affords, in one aspect, a continuous method for purification of a gas stream made up of combustible molecular species of different size. Thus, in the production of isoprene and its subsequent use in rubber synthesis, it is extremely desirable to remove sideproduct impurities, such as piperylene. Following the teachings of this invention, the removal of such impurity may be effectively accomplished by contacting the mixture of isoprene and piperylene with a gaseous oxidant, such as air or oxygen, at combustion temperature with a size selective crystalline aluminosilicate having the interior surfaces thereof imparted with oxidation activity, such as for example the platinum-containing aluminosilicate noted above characterized by an effective pore diameter of 5 angstroms. Isoprene by virtue of its branched structure is unable to reach the sites of catalytic oxidation, while the straight chain piperylene undergoes combustion to $CO_2$ and $H_2O$ which are separable by simple processes such as for example, caustic washing to remove the carbon dioxide, followed by drying to remove the water and to thereby yield a resultant stream of uncontaminated isoprene.

By modifying the crystal pore size of the crystalline aluminosilicate utilizing ion exchange techniques well known in the art, it is possible to realize different selectivities for combustion reactions. For example, exchange with sodium ions yielding a structure having a uniform effective pore diameter of 4 angstroms admits to combustion, methane, $H_2S$, $CO \cdot H_2$, $NH_3$ and ethane but not the higher paraffins. Thus, $H_2S$ may be removed by selective combustion, in accordance with the method of the invention, from a hydrocarbon stream of propane and heavier molecules. It is also within the purview of this invention to burn methane and ethane from a mixed hydrocarbon gas.

The hereinabove described selective combustion process thus affords a continuous operation for purification of a gas stream. Such method can be considered as a process of continual removal by adsorption with simultaneous oxidative regeneration giving rise to a continuous method of operation.

Another aspect of the present invention resides in a method for internally and homogeneously heating the space of a chemical reaction zone by distributing particles of a catalyst described hereinabove, capable of effecting selective combustion throughout the reactor volume and by supplying together with the reactant, which is not subjected to combustion by the aforesaid catalyst, a controlled amount of gaseous oxidant and a fuel component, such as a light hydrocarbon gas of molecular size which permits contact with the interior catalytic oxidation surfaces of the crystalline aluminosilicate combustion composite. In such way, heat may be produced in a manner controllable by the spacial disposition of the selective combustion catalyst and by the controlled amount and geometry of injection of fuel and oxidant. Also, the distribution of selective combustion catalyst particles may be varied or controlled throughout the reactor volume to supply a greater or lesser amount of heat and to thereby satisfy the heat demand in a particular part of the reactor should such be desired.

FIGURE 1 of the attached drawing illustrates a system for utilizing selective combustion to furnish heat to a reaction zone.

Figure 1:
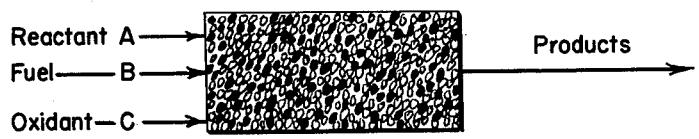

Turning now to FIGURE 1, the white particles represent the catalyst over which the desired reaction is to proceed. The black particles represent the selective combustion catalysts which function as sources of heat. Reactant A is admitted together with a fuel B and an oxidant C. The selective catalyst does not admit molecules of A but does admit molecules of B and C. The reactant catalyst should further not catalyze reaction between B and C or be adversely affected in its major catalytic function by the presence of B or C on their combustion products. The reaction zone is initially controlled at a sufficiently elevated temperature to effect catalytic combustion of fuel B, which together with oxidant C enters the ports of the crystalline aluminosilicate catalyst bearing oxidation surfaces on the interior thereof and is there selectively burned giving off heat to the surrounding reactor volume including the particles of reactant catalyst which, in turn, serve to effect catalytic conversion of reactant A at the temperature so obtained.

Figure 2:
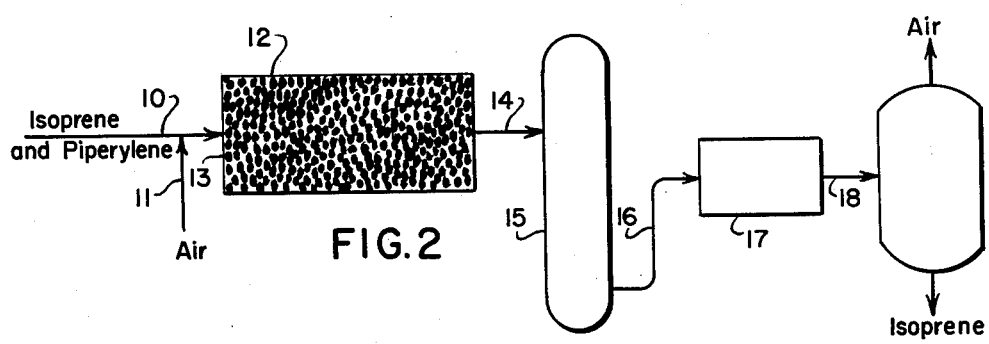
FIGURE 2 illustrates a system for effecting continuous purification of a gas stream made up of combustible species of different molecular size.

In FIGURE 2, there is shown, in highly schematic form, a process utilizing the techniques described herein for continuously purifying a gaseous stream composed of components of different molecular size. In the embodiment depicted, the gaseous stream is isoprene containing piperylene as an impurity. Air is utilized as the oxidant and the crystalline aluminosilicate selective combustion catalyst is one containing platinum on the interior surfaces of the structure characterized by a uniform effective pore diameter of 5 angstroms. Referring to FIGURE 2, the gaseous charge of isoprene and piperylene is introduced through conduit 10 together with air introduced through conduit 11 to reactor 12 containing particles 13 of the selectvie combustion catalyst. The reactor 12 is heated by means not shown to a temperature sufficiently elevated to effect combustion of the piperylene component which, by virtue of its straight chain molecular size, is capable of entering the 5 angstrom pores of the selective combustion catalyst and contacting the catalytic oxidation surfaces contained therein while the isoprene component, due to its branched chain structure, is incapable of admittance to the catalytic oxidation surfaces and hence does not undergo combustion. The products resulting from selective combustion including carbon dioxide and water together with the isoprene and any excess air pass from reactor 12 through conduit 14 to vessel 15 wherein carbon dioxide is removed as a result of caustic washing. The remaining gaseous stream then passes from vessel 15 through conduit 16 to dryer 17 where water is removed. The dried resulting gaseous stream then passes through conduit 18 to condenser 19 maintained at a temperature sufficiently low to effect condensation of isoprene and wherein air is separated from the resulting condensed purified isoprene product which is removed through outlet 20. Air is withdrawn from the condenser through vent 21.

Figure 3:
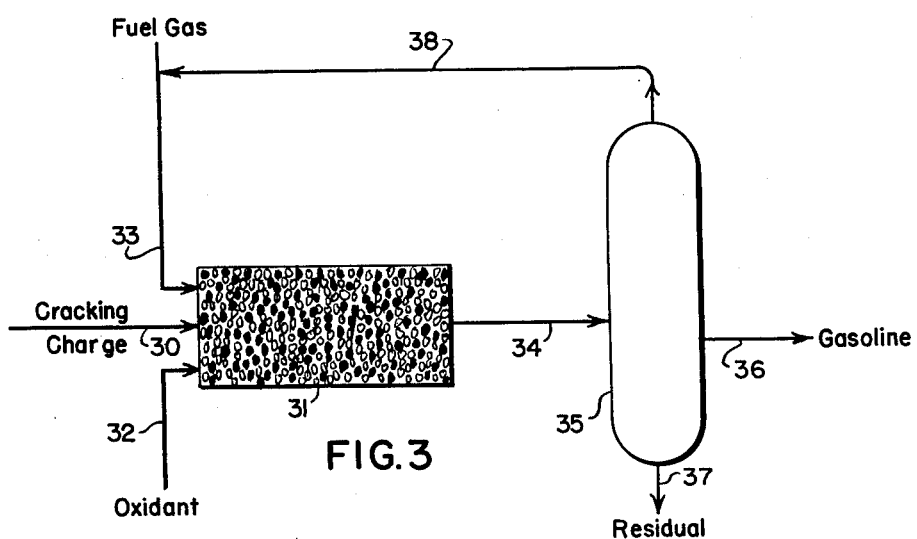
FIGURE 3 illustrates a catalytic cracking reactor wherein heat is furnished as a result of selective catalytic combustion.

Turning now to FIGURE 3, there is illustrated a continuous process for cracking a petroleum hydrocarbon mixture in a reactor wherein heat is supplied utilizing the selective combustion technique of the present invention. The white particles in this system present a suitable cracking catalyst, for example a composite of silica and alumina or the aluminosilicate cracking catalyst described in copending application Serial No. 39,436, filed June 29, 1960. Such cracking catalyst is inert with respect to the oxidant present, for example, oxygen as well as the added fuel gas, i.e. a light hydrocarbon such as methane, ethane or a mixture thereof. The black particles represent the selective combustion catalyst, for example, a transition metal contained within the pores of a crystalline aluminosilicate having a uniform effective pore diameter within the range of about 4 to about 7 angstroms. Such catalyst, at combustion temperatures, and in the presence of the oxidant serves to selectively catalyze the oxidation of methane and ethane will not catalytically affect the larger molecules of the cracking charge and to thereby furnish heat throughout the reaction zone. Methane and/or ethane may be continuously or intermittently supplied to the reaction zone for purposes of the fuel requirement. The cracking reaction serves to generate its own fuel in the form of the dry gases normally produced during the cracking operation and to simultaneously destroy the low octane number straight chain hydrocarbons.

Thus, referring more particularly to FIGURE 3, the cracking charge is introduced through conduit 30 to catalytic cracking reactor 31. An oxidant gas, such as air or oxygen, is introduced through conduit 32 and a suitable fuel gas, for example methane, ethane or mixture thereof, is initially introduced through conduit 33. The molecules of fuel gas, being sufficiently small in molecular dimension enter the pores of the selective combustion catalyst, coming into contact with the interior catalytic oxidation surfaces thereof and undergo combustion to furnish the requisite heat required for conducting desired catalytic cracking. The molecules of cracking charge, by reason of their larger molecular size are unable to penetrate into the interior of the selective combustion catalyst and when the requisite cracking temperature is attained undergo cracking to a mixture of lighter hydrocarbons. Such mixture is removed from reactor 31 through conduit 34 and introduced into fractionating column 35. The desired gasoline fraction is withdrawn through conduit 36. Heavier residual materials are removed from the bottom of column 35 through outlet 37 and dry gases are removed from the upper portion of the column through conduit 38 and desirably are recycled therethrough to line 33, thereby serving as the fuel component in effecting further selective combustion. The dry gases so recycled may, from time to time, or continuously be supplemented with added fuel gas, such as methane and/or ethane, also introduced into the reactor through conduit 33.

It will be understood that the above description is merely illustrative of preferred embodiments of the invention, of which many variations may be made within the scope of the following claims by those skilled in the art without departing from the spirit thereof.

We claim:

1. A process for effecting selective combustion of a combustible mixture of molecules which comprises bringing said mixture, consisting of components of different molecular size, into contact with a gaseous oxidant in the presence of a crystalline aluminosilicate having rigid three dimensional networks and uniform interstitial dimensions sufficiently large to admit at least one of said components but sufficiently small to exclude at least one remaining component and bearing within the interior thereof a chemical component of enhanced catalytic oxidation activity, active in effecting combustion of the sorbed component to at least one product of molecular size capable of passing from the interior of said crystalline aluminosilicate, wherein said contact is carried out in the presence of a sufficient amount of said oxidant at a temperature sufficiently elevated to effect combustion of said sorbed component.

2. A process for selectively effecting combustion of a combustible mixture of molecules of differing molecular size which comprises passing the same together with a gaseous oxidant at combustion temperature over a crystalline aluminosilicate having rigid three dimensional networks bearing within the interior thereof transition metal-containing oxidation surfaces and having uniform interstitial dimensions within the approximate range of 4 to 7 angstroms, whereby at least one species of said molecules is admitted by reason of a molecular size within the aforesaid range to the interior transition metal-containing oxidation surfaces and to undergo catalytic combustion therein while the remainder of said molecules by reason of their larger size are excluded from contact with said interior oxidation surfaces.

3. A continuous process for purifying a gaseous stream composed of at least two components of different molecular size which comprises bringing said stream into contact with a gaseous oxidant and a solid crystalline aluminosilicate having rigid three dimensional networks bearing within the interior thereof transition metal-containing oxidation surfaces and having uniform interstitial dimensions sufficiently large to admit at least one of said components but sufficiently small to exclude at least one remaining component wherein said contact is carried out in the presence of a sufficient amount of said oxidant at a temperature sufficiently elevated to effect removal by combustion of the component admitted to the interior of said aluminosilicate and to yield a resulting product purified of said latter component.

4. A method for internally heating a reaction zone wherein a fluid charge is conducted which comprises introducing into said zone a combustible fuel component together with a gaseous oxidant, in the presence of said charge, and a crystalline aluminosilicate having rigid three dimensional networks bearing within the interior thereof surfaces characterized by a catalytic oxidation activity greater than that possessed by the exterior surface of said aluminosilicate and having uniform interstitial dimensions sufficiently large to admit said fuel component and said oxidant but sufficiently small to exclude molecules of said charge and initiating burning of said fuel component in contact with said catalytic oxidation surfaces.

5. A continuous process for purifying a gaseous stream composed of a normal hydrocarbon and a branched chain hydrocarbon which comprises bringing said stream into contact with a gaseous oxidant and a solid crystalline aluminosilicate having rigid three dimensional networks bearing within the interior thereof platinum metal-containing surfaces and having uniform interstitial dimensions sufficiently large to admit said normal hydrocarbon but sufficiently small to exclude said branched chain hydrocarbon, wherein said contact is carried out in the presence of a sufficient amount of said oxidant at a temperature sufficiently elevated to effect complete combustion of said normal hydrocarbon in contact with the platinum metal-containing catalytic surfaces to carbon dioxide and water and removing carbon dioxide, water and oxidant from the resulting gaseous stream to yield a resulting product of said branched chain hydrocarbon.

6. A method for internally heating a catalytic reaction zone wherein an endothermic reaction involving a fluid charge is carried out in the presence of a conversion catalyst which comprises introducing into said reaction zone together with said charge, an oxidant and a combustible fuel component and in admixture with said conversion catalyst, a crystalline aluminosilicate having rigid three dimensional networks bearing within the interior thereof transition metal-containing catalytic oxidation surfaces and having uniform interstitial dimensions sufficiently large to admit said oxidant and said fuel component but sufficiently small to exclude said fluid charge and initiating combustion of said fuel component in contact with said catalytic oxidation surfaces, whereby the temperature of said reaction zone is sufficiently raised to effect catalytic conversion of said fluid charge in the presence of said conversion catalyst.

7. A method for internally heating a catalytic cracking zone wherein a fluid hydrocarbon charge undergoes cracking in the presence of a solid porous cracking catalyst which comprises introducing into said zone together with said charge an oxidant and a combustible fuel component and, in admixture with said cracking catalyst, a crystalline aluminosilicate having rigid three dimensional networks bearing within the interior thereof transition metal-containing catalytic oxidation surfaces and having uniform interstitial dimensions sufficiently large to admit said oxidant and said fuel component but sufficiently small to exclude molecules of said hydrocarbon charge, initiating combustion of said fuel component, in contact with said catalytic oxidation surfaces whereby the temperature of said reaction zone is raised to a temperature sufficiently elevated to effect cracking of said hydrocarbon charge to valuable normally liquid hydrocarbons lighter than said charge and dry gases and recyling said dry gases which serve as the fuel component to said cracking zone.

8. A continuous process for purifying a gaseous stream of isoprene and piperlyene which comprises bringing said stream into contact with a gaseous oxidant and a solid crystalline alumino-silicate having rigid three dimensional networks bearing within the interior thereof platinum metal-containing surfaces and having uniform interstitial dimensions sufficiently large to admit piperylene but sufficiently small to exclude isoprene, wherein said contact is carried out at a temperature sufficiently elevated to effect complete combustion of said piperylene in contact with the platinum metal-containing catalytic surfaces to carbon dioxide and water removing carbon dioxide, water and oxidant from the resulting gaseous stream to yield a resulting product of purified isoprene.

9. A method for internally heating a catalytic cracking zone wherein a fluid hydrocarbon charge undergoes cracking in the presence of a solid porous cracking catalyst which comprises introducing into said zone together with said charge an oxidant and a combustible fuel component and, in admixture with said cracking catalyst, a crystalline aluminosilicate having rigid three dimensional networks bearing within the interior thereof catalytic oxidation surfaces and having uniform interstitial dimensions sufficiently large to admit said oxidant and said fuel component but sufficiently small to exclude at least a portion of said hydrocarbon charge, initiating combustion of said fuel component in contact with said catalytic oxidation surfaces whereby the temperature of said reaction zone is sufficiently elevated to effect cracking of said hydrocarbon charge to normally liquid hydrocarbons lighter than said charge and a gaseous product and utilizing said gaseous product as the aforementioned fuel component.

References Cited in the file of this patent

UNITED STATES PATENTS

| | | |
|---|---|---|
| 2,704,778 | Maisel | Mar. 22, 1955 |
| 2,900,430 | Henke et al. | Aug. 18, 1959 |
| 2,921,970 | Gilmore | Jan. 19, 1960 |
| 2,924,630 | Fleck et al. | Feb. 9, 1960 |
| 2,962,435 | Fleck et al. | Nov. 29, 1960 |
| 2,969,407 | Rosenberg et al. | Jan. 24, 1961 |
| 2,971,903 | Kimberlin et al. | Feb. 14, 1961 |
| 2,971,904 | Gladrow et al. | Feb. 14, 1961 |
| 3,033,778 | Frilette | May 8, 1962 |

UNITED STATES PATENT OFFICE
CERTIFICATE OF CORRECTION

Patent No. 3,136,713              June 9, 1964

Joseph N. Miale et al.

It is hereby certified that error appears in the above numbered patent requiring correction and that the said Letters Patent should read as corrected below.

Column 4, line 17, for "instant" read -- instance --; lines 46 and 47, strike out "crystal-oxygen, ozone, sulfur dioxide, sulfur, chlorine, nitrogen" and insert instead -- crystalline aluminosilicate and to contact the catalytic oxidation --; column 6, line 15, for "on" read -- or --.

Signed and sealed this 1st day of December 1964.

(SEAL)
Attest:

ERNEST W. SWIDER
Attesting Officer

EDWARD J. BRENNER
Commissioner of Patents